P. DYMORA.
MOUSE TRAP.
APPLICATION FILED JUNE 26, 1918.

1,279,303.

Patented Sept. 17, 1918.
2 SHEETS—SHEET 1.

Inventor
P. Dymora

By  _[signature]_
Attorney

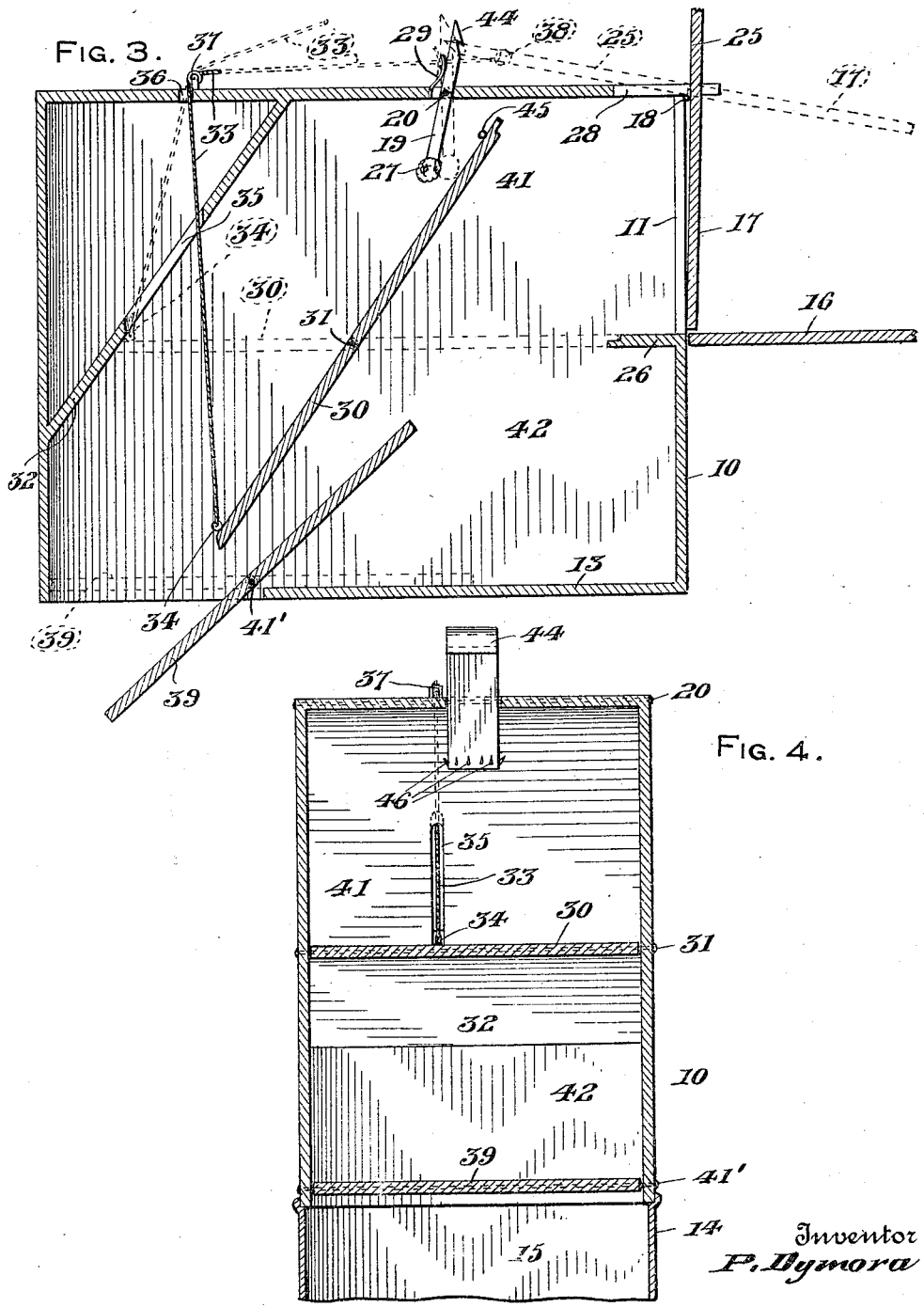

UNITED STATES PATENT OFFICE.

PETER DYMORA, OF EAST COLUMBUS, OHIO.

MOUSE-TRAP.

1,279,303.     Specification of Letters Patent.     Patented Sept. 17, 1918.

Application filed June 26, 1918. Serial No. 241,970.

*To all whom it may concern:*

Be it known that I, PETER DYMORA, a subject of the Emperor of Austria, residing at East Columbus, in the county of Franklin and State of Ohio, have invented certain new and useful Improvements in Mouse-Traps, of which the following is a specification.

The primary object of the invention is the provision of a trap adapted for catching mice and similar small animals and depositing them in an execution chamber while the device automatically resets itself after each catching operation.

A further object of the invention is the provison of a trap that is inexpensive to manufacture adapted for automatic resetting by the animal catching operation of which the device is capable, provision being further made if desired for executing the animal which has been caught alive in the trap.

In the drawings forming a part of this application and in which like reference characters designate corresponding parts throughout the several views, Figure 1 is a central vertical sectional view taken through the device when in its set position with the depositing receptacle broken away;

Fig. 3 is a view similar to Fig. 1 with the device removed from the depositing receptacle and illustrating the catching operation; and Fig. 4 is a vertical sectional view taken upon line IV—IV of Fig. 1.

Figure 1:
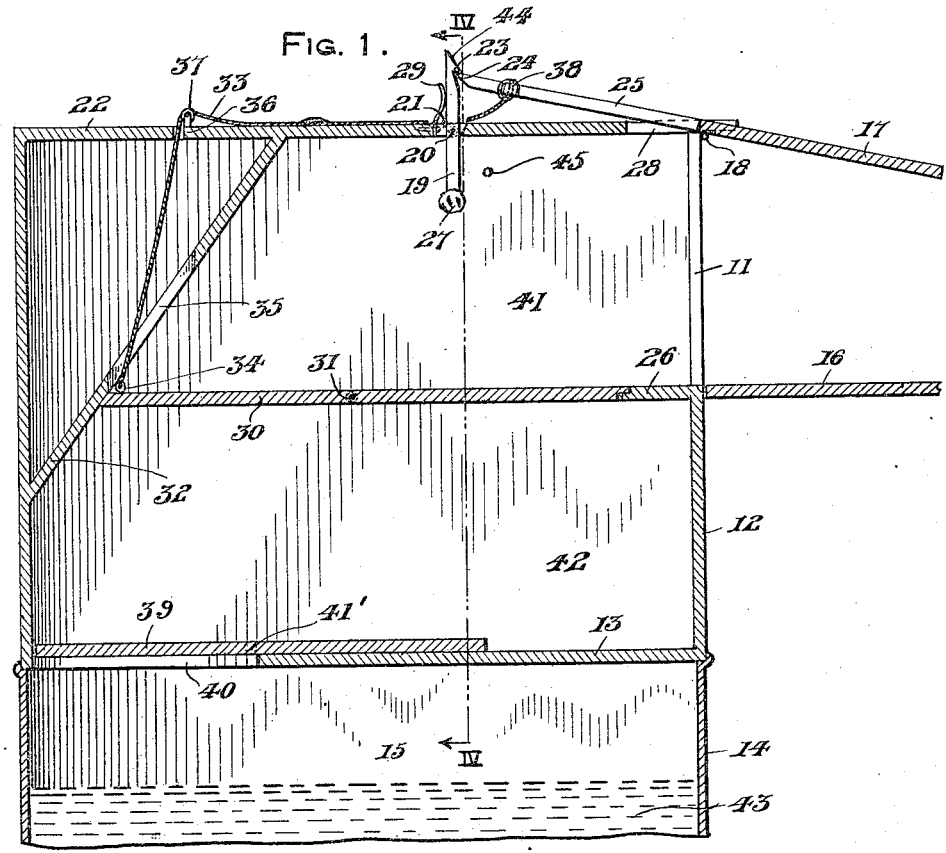
Figure 2:
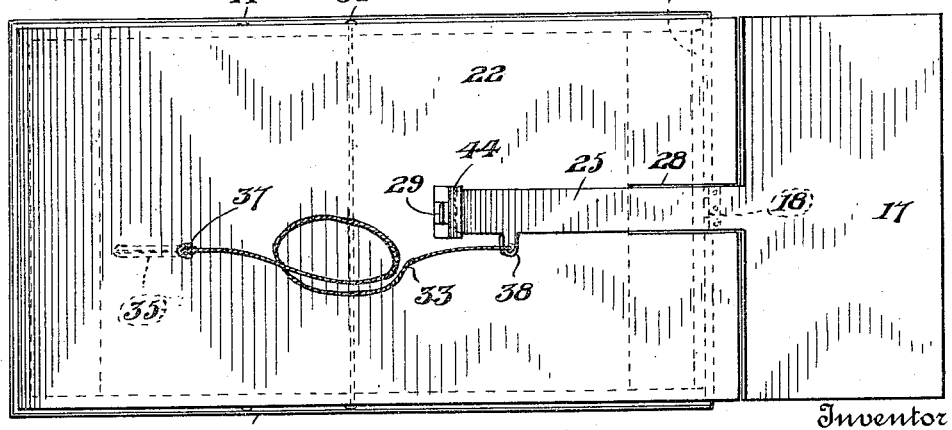
Fig. 2 is a top plan view thereof.

Referring more in detail to the drawings, my trap broadly consists of a box shaped casing 10 having an entrance doorway 11 in the front side 12 thereof and the casing is adapted for seating with its bottom 13 upon the open top of a deposit receptacle 14 providing a chamber 15 therein for executing the animals after the same have been entrapped in the said casing.

An approach or platform 16 is provided for the doorway 11 while a door 17 hinged to the casing, as at 18, above the said doorway is adapted for swinging to its closed position when released by the trapping mechanism hereinafter described. A trip bar 19 is pivoted by means of a pin 20 through a slot 21 in the top 22 of the casing 10 and is provided with a notch 23 in the forward face thereof adapted to receive the sharpened end 24 of an upward extension 25 of the door 17. A horizontal partition 26 is provided in the casing 10 upon which the animal travels when passing into the casing from the platform 16 through the door opening 11.

Suitable bait 27 is provided upon the lower end of the trip bar 19 and when the bait is grabbed by the animal entering the trap, the trip bar 19 will be pivotally shifted for releasing the extension end 24 and permitting the door 17 to fall by reason of its own weight to its closed position relatively of the opening 11. A slot 28 is provided in the top 22 for accommodating the swinging movement of the door extension 25, it being understood that the slots 20 and 28 are of insufficient size to prevent the animal from escaping from the trap therethrough. A leaf spring 29 is secured within the slot 20 adapted for forwardly moving the upper end of the trip bar 19 when released from the door extension 25 as best illustrated in Fig. 3 of the drawing.

The major portion of the partition 26 comprises a pivoted section 30 having a pivot rod 31 secured transversely and substantially centrally through the casing 10, the said section when in its horizontal closed position having its rear edge engaging an oblique plate 32 spanning the rear upper corner portion of the casing 10. A resetting cord 33 is attached as at 34 adjacent the rear end of the pivoted section 30 and extends through a slot 35 in the plate 32 and through an opening 36 in the top of a casing and thence over a pulley 37 upon the casing top with the end of the cord secured to a side lug 38 of the door extension 25.

A trap door 39 is provided in the bottom 13 of the casing for normally closing an opening 40 in said bottom, the portion of said trap door which is forwardly of the pivoting rod 41′ thereof being of sufficient weight to automatically close the trap door after the same has been opened and which forward portion flatly engages the casing bottom 13 when the trap door is closed.

The animal having entered the catching chamber 41 above the partition 26 and having tripped the bar 19 to permit the door 17 to close, the animal is thereby imprisoned in the said catching chamber. When the animal walks upon the portion of the section 30 rearwardly of its pivoting rod 31, the section 30 will tip downwardly and the animal will fall into the bottom chamber 42 of the casing 10 and upon landing on the rear portion of the trap door 39 the rear portion is tilted downwardly and the animal precipitated into the execution chamber 15.

Fluid 43 such as water, is provided in the chamber 15 of the deposit receptacle 14 for drowning the animal therein, while the trap door 39 automatically returns to its closed horizontal position as heretofore noted. The tilting movement of the partition section 30 exerts a sudden pull upon the cord 33 which is of a length to be substantially taut when the section 30 and door 17 are closed with the animal entrapped in the chamber 41. This sudden pull upon the cord 33 jerks the extension 25 rearwardly engaging the same beneath the spring pressed trip bar 19 which is forwardly inclined by means of the spring 29, the upper forward end of the bar 19 being inclined, as at 44, permitting the extension end 24 to wipe thereover for seating into the notch 23 and retaining the door 17 opened with the bar 19 in its vertical set arrangement. It will be noted that the extension 25 and the bar 19 are of sufficient width to afford substantial engagement between the said members when the trap is set and that the lug 38 permits the cord 33 to readily position itself upon the casing top 22 when the cord is slackened without interfering with the connection between the extension 25 and bar 19 during the tripping and resetting operations.

It will be obvious that the trap may be employed with the casing 10 mounted upon a solid foundation instead of being carried by the deposit receptacle 14 and in this event the animal will remain imprisoned in the bottom chamber 42 until released by the attendant. The device is adapted for successively catching large numbers of animals, this being made possible by the automatic resetting of the trap after each catching operation. A stop 45 is preferably provided in the catching chamber 41 for limiting the swinging movement of the partition section 30 as best illustrated in Fig. 3 of the drawings. A plurality of barbs 46 are preferably provided adjacent the lower end of the bar 19 adapted for holding the bait 27.

What I claim as new is:—

A trap comprising a casing having a door opening adjacent the top thereof and having an outlet opening in the bottom of the casing, a transverse partition in the casing beneath the level of the door opening having a pivoted section adapted for downward swinging movement under the weight of an animal caught in the trap, an inclined plate and a stop pin within the casing adapted for limiting the swinging movement of said section in opposite directions, a trip bar pivoted through the top of the casing having a notched end above the casing and a bait receiving portion at its lower end within the casing, an extension upon said door adapted for automatic engagement with the notch of said bar when the door is opened, and a cord between said extension and partition section adapted for automatically opening the door for setting the trap during the operative swinging movement of said section.

In testimony whereof I affix my signature.

PETER DYMORA.